United States Patent
Mutzl et al.

(10) Patent No.: US 12,348,109 B2
(45) Date of Patent: Jul. 1, 2025

(54) ENCLOSED ELECTRIC MACHINE WITH EXTERNAL LIQUID COOLING CIRCUIT AND AIR COOLING CIRCUIT

(71) Applicant: Innomotics GmbH, Nuremberg (DE)

(72) Inventors: Thomas Mutzl, Tettenweis (DE); Thomas Osterholzer, Kösslarn (DE); Martin Stoiber, Fuerstenzell (DE)

(73) Assignee: Innomotics GmbH, Nuremberg (DE)

( * ) Notice: Subject to any disclaimer, the term of this patent is extended or adjusted under 35 U.S.C. 154(b) by 658 days.

(21) Appl. No.: 17/437,311

(22) PCT Filed: Feb. 17, 2020

(86) PCT No.: PCT/EP2020/054015
§ 371 (c)(1),
(2) Date: Sep. 8, 2021

(87) PCT Pub. No.: WO2020/182415
PCT Pub. Date: Sep. 17, 2020

(65) Prior Publication Data
US 2022/0181947 A1    Jun. 9, 2022

(30) Foreign Application Priority Data
Mar. 14, 2019   (EP) .................... 19162814

(51) Int. Cl.
*H02K 5/20* (2006.01)
*H02K 9/08* (2006.01)
*H02K 9/12* (2006.01)

(52) U.S. Cl.
CPC ............ *H02K 5/207* (2021.01); *H02K 5/203* (2021.01); *H02K 9/08* (2013.01); *H02K 9/12* (2013.01)

(58) Field of Classification Search
CPC ............ H02K 1/24; H02K 1/28; H02K 1/02; H02K 1/32; H02K 1/265; H02K 1/26;
(Continued)

(56) References Cited
U.S. PATENT DOCUMENTS 2,285,960 A * 6/1942 Fechheimer ........... H02K 9/197
                                                                        290/2
3,157,806 A * 11/1964 Wiedemann ............. H02K 3/22
                                                                        310/43
(Continued)

FOREIGN PATENT DOCUMENTS

| CN | 1503433 A | 6/2004 | ............... H02K 9/00 |
| CN | 101938191 A * | 1/2011 | ............... H02K 1/20 |

(Continued)

OTHER PUBLICATIONS

CN101938191A English Translation.*
(Continued)

*Primary Examiner* — Maged M Almawri
(74) *Attorney, Agent, or Firm* — Henry M. Felereisen LLC

(57) ABSTRACT

An electric machine includes a rotor surrounded by a stator. An external jacket surrounds the stator and extends between front and rear end parts, thereby delimiting an inner region which accommodates the rotor, and an outer region radially surrounding the inner region. The inner and outer regions communicate with one another via recesses to enable air to flow out of the inner region and into the outer region and from there to flow back into the inner region. Front and rear closing elements are attached to the front and rear end parts on their side facing away from the external jacket, thereby enclosing a front cavity and a rear cavity. Axial tubes are fastened in the front and rear end parts such that the axial (Continued)

tubes extend from the front end part across the outer region to the rear end part and open in the front and rear cavities.

8 Claims, 5 Drawing Sheets

(58) Field of Classification Search
CPC ............ H02K 3/527; H02K 3/52; H02K 3/34; H02K 3/345; H02K 1/00; H02K 1/325; H02K 3/18; H02K 19/02; H02K 19/16; H02K 19/38; H02K 9/22; H02K 9/02; H02K 9/19; H02K 19/12; H02K 19/08; H02K 5/207; H02K 5/04; H02K 5/203; H02K 2213/03; H02K 11/20
USPC .............. 310/261.1–266, 216.001, 216.074, 310/216.091, 216, 59, 61, 52, 54, 57, 58, 310/262, 433, 216.132, 216.086, 79, 310/216.013, 216.004, 269
See application file for complete search history.

(56) References Cited

U.S. PATENT DOCUMENTS

| | | | | |
|---|---|---|---|---|
| 3,252,015 A * | 5/1966 | Johnson | ................ | H01J 45/00 165/104.31 |
| 3,312,054 A * | 4/1967 | Anderson | ............... | F01K 15/04 310/306 |
| 3,457,439 A | 7/1969 | Gering et al. | ............ | H02K 9/00 |
| 3,760,603 A * | 9/1973 | Dicic | ...................... | F16C 37/00 310/227 |
| 4,306,165 A * | 12/1981 | Kitabayashi | ............. | H02K 9/18 310/59 |
| 4,312,480 A * | 1/1982 | Miller | ..................... | F02K 1/825 239/265.17 |
| 4,384,222 A * | 5/1983 | Zerlik | ..................... | H02K 9/19 62/505 |
| 4,456,842 A * | 6/1984 | Tachibana | ................ | H02K 1/32 310/59 |
| 4,475,052 A * | 10/1984 | Okamoto | ................. | H02K 3/47 310/179 |
| 4,852,245 A * | 8/1989 | Denk | ....................... | H02K 3/47 29/606 |
| 4,885,494 A * | 12/1989 | Higashi | ................... | H02K 9/19 310/201 |
| 5,140,204 A * | 8/1992 | Cashmore | .............. | H02K 9/225 310/214 |
| 5,189,325 A * | 2/1993 | Jarczynski | ............. | H02K 9/197 310/61 |
| 5,825,116 A * | 10/1998 | Ishikawa | .............. | H02K 21/044 310/263 |
| 6,891,290 B2 * | 5/2005 | Nagayama | .............. | H02K 9/18 310/58 |
| 7,489,057 B2 * | 2/2009 | Zhou | ...................... | H02K 9/197 310/61 |
| 7,737,584 B2 * | 6/2010 | Muller | ................... | H02K 5/203 310/58 |
| 8,080,908 B2 * | 12/2011 | Matsubara | ............... | H02K 1/32 310/156.53 |
| 8,519,580 B2 * | 8/2013 | Brandl | ..................... | H02K 9/16 310/58 |
| 8,536,744 B2 * | 9/2013 | Nagayama | ............... | H02K 9/06 310/58 |
| 9,680,340 B2 * | 6/2017 | Noack | ...................... | H02K 9/06 |
| 9,768,666 B2 * | 9/2017 | Büttner | ................... | H02K 1/20 |
| 9,806,586 B2 * | 10/2017 | Granat | ..................... | H02K 1/32 |
| 9,819,247 B2 * | 11/2017 | Leberle | .................. | H02K 9/197 |
| 10,135,319 B2 * | 11/2018 | Hanumalagutti | ........ | B60K 1/00 |
| 10,298,094 B2 * | 5/2019 | Yamaguchi | ............... | H02K 9/26 |
| 10,418,882 B2 * | 9/2019 | Kaneko | ..................... | H02K 9/02 |
| 10,804,755 B2 * | 10/2020 | Channapatana | ..... | H02K 15/021 |
| 11,418,077 B2 * | 8/2022 | Krais | ...................... | H02K 7/003 |
| 2004/0080218 A1 * | 4/2004 | Weidman | ................. | H02K 1/32 310/61 |
| 2004/0150270 A1 | 8/2004 | Nagayama et al. | | |
| 2007/0035187 A1 * | 2/2007 | Verhaegen | ............... | H02K 3/24 310/411 |
| 2008/0290662 A1 * | 11/2008 | Matesanz Gil | ......... | F03D 80/60 290/55 |
| 2009/0284087 A1 | 11/2009 | Takahashi et al. | ...... | H02K 9/06 |
| 2010/0264759 A1 * | 10/2010 | Shafer | .................... | H02K 9/197 310/54 |
| 2011/0008184 A1 * | 1/2011 | De Boer | ................. | H02K 9/197 417/423.8 |
| 2012/0068557 A1 * | 3/2012 | Duesing | ............. | H02K 11/0094 310/43 |
| 2013/0038151 A1 * | 2/2013 | Ohashi | .................... | H02K 7/086 310/59 |
| 2013/0234543 A1 * | 9/2013 | Buttner | .................. | B60L 3/0061 310/54 |
| 2013/0257197 A1 * | 10/2013 | Buttner | ..................... | H02K 1/20 310/54 |
| 2013/0270939 A1 * | 10/2013 | Brandl | .................... | H02K 5/203 310/54 |
| 2013/0313938 A1 * | 11/2013 | Yamada | ................. | H02K 16/02 310/156.69 |
| 2014/0265660 A1 * | 9/2014 | Kulkarni | ................ | H02K 9/197 310/54 |
| 2014/0333163 A1 * | 11/2014 | Horii | ......................... | H02K 9/10 310/59 |
| 2015/0017033 A1 | 1/2015 | Sakkinen et al. | | |
| 2015/0280521 A1 * | 10/2015 | Umemoto | ................ | H02K 9/20 310/55 |
| 2015/0340922 A1 * | 11/2015 | Kamiya | ............... | H02K 5/1732 310/58 |
| 2016/0105069 A1 * | 4/2016 | Nakazawa | ............... | H02K 9/04 310/59 |
| 2016/0178548 A1 * | 6/2016 | Berry | ....................... | F28D 15/00 374/138 |
| 2016/0204680 A1 | 7/2016 | Noack et al. | | |
| 2017/0047822 A1 * | 2/2017 | Horii | ........................ | H02K 5/203 |
| 2017/0163125 A1 | 6/2017 | Granat et al. | | |
| 2018/0198331 A1 * | 7/2018 | Sano | ...................... | H02K 1/276 |
| 2019/0267859 A1 * | 8/2019 | Kitahara | ................ | H02K 1/276 |
| 2020/0295628 A1 * | 9/2020 | Reichert | ................ | H02K 5/203 |

FOREIGN PATENT DOCUMENTS

| | | | | |
|---|---|---|---|---|
| CN | 103283129 A | 9/2013 | ............... | H01K 9/19 |
| CN | 104369853 A | 2/2015 | ............... | B63H 21/17 |
| CN | 204141691 U | 2/2015 | ............... | F24D 19/00 |
| CN | 104838563 A | 8/2015 | ............... | H02K 1/20 |
| CN | 106489228 A | 3/2017 | ............... | H01K 9/18 |
| DE | 202012007328 U1 | 8/2012 | ............... | H02K 9/06 |
| EP | 2 824 806 A1 | 1/2015 | | |
| WO | WO 2016-008709 A1 | 1/2016 | | |

OTHER PUBLICATIONS

PCT International Search Report and Written Opinion of International Searching Authority mailed May 20, 2020 corresponding to PCT International Application No. PCT/EP2020/054015 filed Feb. 17, 2020.

* cited by examiner

ENCLOSED ELECTRIC MACHINE WITH EXTERNAL LIQUID COOLING CIRCUIT AND AIR COOLING CIRCUIT

CROSS-REFERENCES TO RELATED APPLICATIONS

This application is the U.S. National Stage of International Application No. PCT/EP2020/054015, filed Feb. 17, 2020, which designated the United States and has been published as International Publication No. WO 2020/182415 A1 and which claims the priority of European Patent Application, Ser. No. 19/162,814.8, filed Mar. 14, 2019, pursuant to 35 U.S.C. 119(a)-(d).

BACKGROUND OF THE INVENTION

The present invention is based on an electric machine,
wherein the electric machine has a rotor and a stator,
wherein the rotor is able to rotate about an axis of rotation of the electric machine,
wherein, when viewed about the axis of rotation, the rotor is surrounded by the stator and the stator is surrounded by an external jacket,
wherein the external jacket, when viewed in the direction of the axis of rotation, in each case extends from a front end part to a rear end part, so that the front and the rear end part and the stator delimit an inner region which contains the rotor, and the front and the rear end part, the stator and the external jacket delimit an outer region which surrounds the inner region radially on the outside,
wherein the inner region and the outer region are interconnected in a communicating manner via recesses, so that air is able to flow out of the inner region and into the outer region, from which it can flow back into the inner region again,
wherein axially running tubes are fastened in the front and in the rear end part in each case, so that the axially running tubes extend from the front end part, over the outer region, to the rear end part in each case.

In some applications, the electric machines used have to be enclosed in the ignition protection type Ex d. Electric machines of this kind, however, are also required in increasingly large design models.

In large design models of electric machines of this kind, the electric machines are often embodied as already set out above. These electric machines are cooled by air. To this end, a fan is attached on one of the two end sides on a side facing away from the external jacket, by means of which cooling air is blown through the axially running tubes for secondary cooling.

Air is a comparatively poor cooling medium. It would be better to be able to cool the electric machine with a liquid coolant—in particular water—as part of the secondary cooling.

An electric machine of the kind mentioned in the introduction is known from U.S. Pat. No. 3,457,439 A or CN 101 938 191 A, for example, An electric machine of this kind can also be found in WO 2016/008 709 A1.

The object of the present invention consists in creating an electric machine of the kind mentioned in the introduction, which is cooled by a liquid coolant.

SUMMARY OF THE INVENTION

The object is achieved by an electric machine as set forth hereinafter. Advantageous embodiments of the electric machine are the subject matter of the dependent claims.

According to the invention, an electric machine of the kind mentioned in the introduction is designed such that
on the front and the rear end part, on their side facing away from the external jacket in each case, a front and a rear closing element are attached in a liquid-tight manner, so that the front end part and the front closing element enclose a front cavity and the rear end part and the rear closing element enclose a rear cavity,
that the axially running tubes open in the front and rear cavity,
that the front cavity is divided into at least two subregions by means of a separating wall,
that one portion of the axially running tubes opens in one of the subregions and another portion of the axially running tubes opens in another of the subregions,
that a connecting piece for supplying the liquid coolant is arranged in the one subregion and
that the connecting piece for discharging the liquid coolant is arranged in the other subregion.

The at least two subregions are separated from one another in a liquid-tight manner by means of the separating wall. The front cavity is closed in a liquid-tight manner with the exception of the connecting pieces for supplying and discharging the liquid coolant and the access points to the axially running tubes. The rear cavity is closed in a liquid-tight manner with the exception of the access points to the axially running tubes.

Preferably, the front and the rear end part and the external jacket enclose the rotor and the stator in the ignition protection type Ex d. This makes it possible to also use the electric machine in an environment potentially at risk of explosions.

The axially running tubes have an inner diameter and an outer diameter. Preferably, the axially running tubes have a respective radial spacing from the stator, which is at least as large as the inner diameter, in particular even at least as large as the outer diameter. In a simple manner, this creates a region in which a seal can be arranged in order to seal off the two closing elements with respect to the end parts.

It is possible for the axially running tubes to be embodied as double-walled tubes, which in each case have an internal inner tube which guides the liquid coolant and an outer tube which surrounds the inner tube and around which the air, which flows out of the inner region and into the outer region, flows in the outer region. Although this embodiment is relatively complex, in return it offers the advantage that a simple leak in one of the inner tubes is not able to lead to an accumulation of liquid in the inner region.

Alternatively, it is possible for the axially running tubes to be embodied as single-walled tubes, which guide the liquid coolant on the inside and around which the air, which flows from the inner region into the outer region, flows on the outside.

In both cases, it is advantageous if a detector facility for detecting liquid is arranged in the inner region and/or in the outer region. As a result, in good time before an electrical short circuit caused by the liquid coolant, it is possible to notice the risk of such a short circuit and warn of it, or possibly even shut down the electric machine automatically.

Preferably, the axially running tubes, when viewed about the axis of rotation, are arranged distributed over an angle of more than 180° about the axis of rotation. This makes it possible to achieve efficient cooling despite a relatively compact design model. In other cases, however, it is also possible to fall below this angle.

Preferably, the stator is surrounded by an internal jacket without spacing and the internal jacket has a radial spacing from the outer jacket.

BRIEF DESCRIPTION OF THE DRAWING

The above-described properties, features and advantages of this invention as well as the manner in which they are achieved will become clearer and more comprehensible in conjunction with the following description of the exemplary embodiments, which are explained in more detail in conjunction with the drawings, in which, in a schematic representation.

DETAILED DESCRIPTION OF PREFERRED EMBODIMENTS

Figure 1:
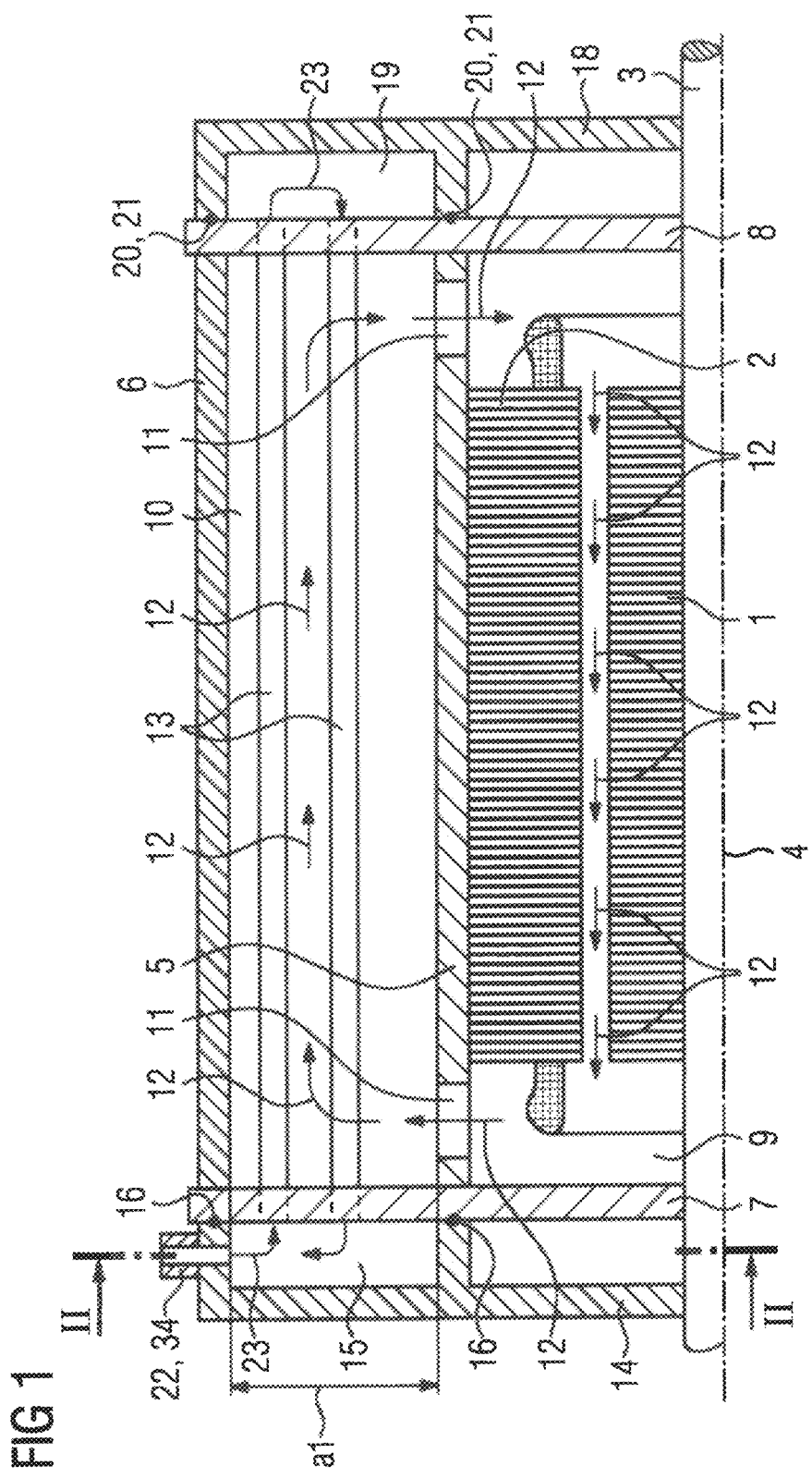
FIG. 1 shows a longitudinal section through an electric machine.

According to FIG. 1, an electric machine has a stator 1 and a rotor 2. The rotor 1 is arranged on a rotor shaft 3, which is rotatably mounted. The rotor shaft 3 and with it the rotor 1 can be rotated about an axis of rotation 4 of the electric machine as a result.

Insofar as reference is made hereinbelow to "axial", "radial" and "tangential", these always relate to the axis of rotation 4. "Axial" is a direction parallel to the axis of rotation 4. "Radial" is a direction orthogonal to the axis of rotation 4 directly toward the axis of rotation 4 or away from it. "Tangential" is a direction which is both orthogonal to the axial direction and orthogonal to the radial direction. "Tangential" is therefore a direction which is directed around the axis of rotation 4 in a circular manner, with a constant axial position and with a constant radial spacing from the axis of rotation 4.

In the context of the present invention, the stator 2 is arranged radially on the outside, and the rotor 1 radially on the inside. Furthermore, according to the representation in FIG. 1, the stator 2 is surrounded by an internal jacket 5 without a spacing. This is not mandatory however. Alternatively, the stator 2 could also only be surrounded by multiple rings, wherein a ring is arranged at least on the two axial ends of the stator 2 in each case. The stator 2 is surrounded by an external jacket 6, however. The external jacket 6 has a radial spacing a1 from the stator 2 or from the internal jacket 5 as appropriate.

The external jacket 6 generally has a cylindrical shape. Where present, the same generally also applies to the inner jacket 5. The radial spacing a1 is often constant when viewed in the tangential direction. However, deviations from the cylindrical shape—both for the external jacket 6 and also for the internal jacket 5 as appropriate—are also possible. The radial spacing a1 can therefore also vary.

The external jacket 6 extends in the axial direction from a front end part 7 to a rear end part 8 in each case. The two end parts 7, 8 are generally embodied in one piece or in each case consist of multiple parts interconnected with a material fit. The two end parts 7, 8 and the stator 2, and the internal jacket 5 as appropriate, delimit an inner region 9. The inner region 9 contains the rotor 1. Furthermore, the two end parts 7, 8, the stator 2 and the external jacket 6 delimit an outer region 10, which surrounds the inner region 9 radially on the outside. Preferably, the two end parts 7, 8 and the external jacket 6 furthermore enclose the rotor 1 and the stator 2 in the ignition protection type Ex d. The term "ignition protection type Ex d" has a fixed meaning to the person skilled in the art. Corresponding implementations of the encapsulation are likewise familiar to the person skilled in the art.

The inner region 9 and the outer region 10 are interconnected in a communicating manner via recesses 11, so that air 12 is able to flow out of the inner region 9 and into the outer region 10, from which it can flow back into the inner region 9 again. Where the internal jacket 5 is present, the recesses 11 may be present in the internal jacket 5. The air 12 flowing from the inner region 9 into the outer region 10 and back again forms an internal cooling circuit of the electric machine.

The internal cooling circuit is generally single-flow or double-flow—but exceptions are possible in principle. In a single-flow internal cooling circuit, according to the representation in FIG. 1, a recess 11 is arranged in the vicinity of each of the two end parts 7, 8. The air 12 flows through the one of the two recesses 11 from the inner region 9 into the outer region 10, and through the other of the two recesses 11 from the outer region 10 into the inner region 9. In a double-flow internal cooling circuit (not shown, but likewise can be implemented), there is additionally a further recess 11 approximately in the middle between the two end parts 7, 8. In this case, the air 12 flows through the two recesses 11 in the vicinity of the two end parts 7, 8 from the outer region 10 into the inner region 9, and through the recess arranged therebetween from the inner region 9 into the outer region 10. These and, as appropriate, also other embodiments of the internal cooling circuit are generally known to persons skilled in the art. For this reason, they do not need to be explained any further.

Furthermore, tubes 13 are fastened in the two end parts 7, 8. The tubes 13 run axially. In each case, the tubes 13 extend from the front end part 7, over the outer region 10, to the rear end part 8. As a general rule, the tubes 13 are fastened in the end parts 7, 8 such that they can no longer be removed from the end parts 7, 8 without being destroyed. For example, they may be welded to the end parts 7, 8.

Figure 2:
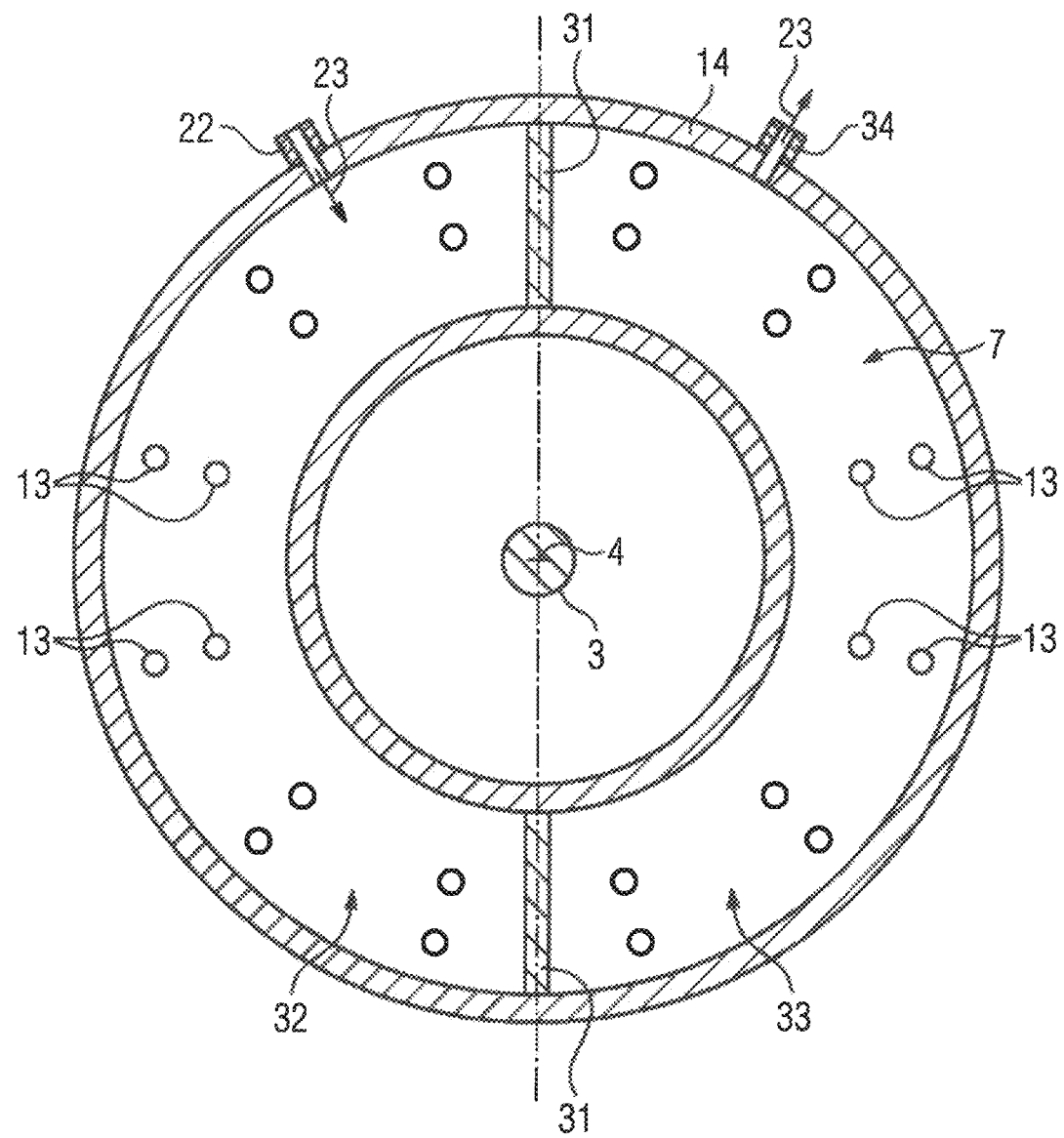
FIG. 2 shows a section along a line II-II in FIG. 1.

According to the representation in FIG. 2, when viewed in the tangential direction, the tubes 13 are generally arranged distributed over an angle of more than 180° about the axis of rotation 4. The arrangement specifically shown in FIG. 2 and also the number of tubes 13 shown in FIG. 2, however, are only to be considered examples. In FIG. 2, only a few of the tubes 13 are provided with their reference character, in order to not overload FIG. 2 unnecessarily. Often, when viewed in the tangential direction, the tubes 13 are even arranged distributed over an angle of more than 270° about the axis of rotation 4, sometimes even essentially all the way around according to the representation in FIG. 2. In any case, in relation to a vertical plane E which contains the axis of rotation 4, the tubes 13 are furthermore arranged essentially equally on both sides of the plane E.

Figure 3:
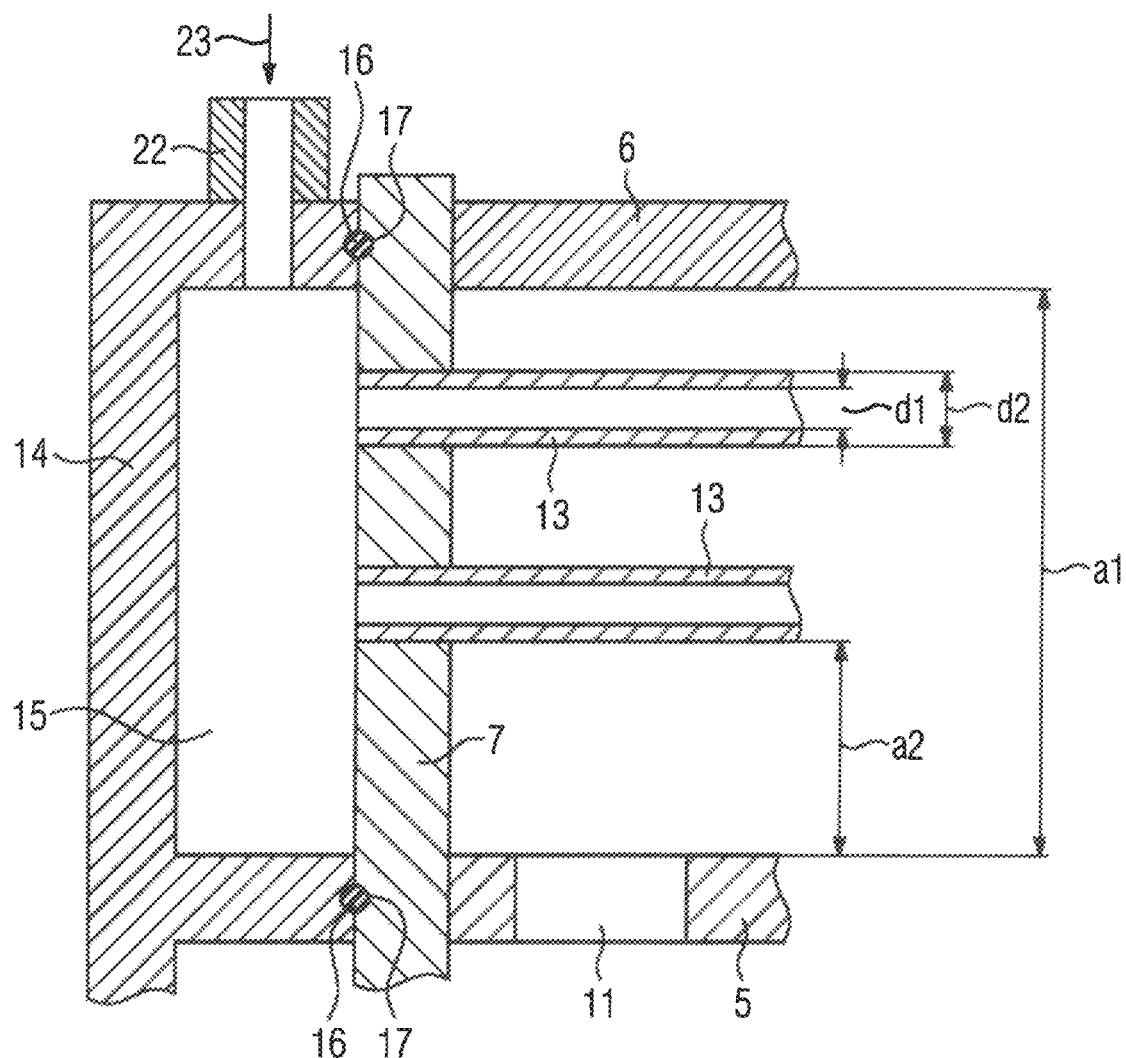
FIG. 3 shows a detail of FIG. 1.

Attached to the front end part 7, on its side facing away from the external jacket 6—i.e. in the axial direction—is a front closing element 14. FIG. 3 shows this in detail. The embodiment of the connecting point between the front part 7 and the front closing element 14 is such that a liquid-tight seal is produced. The front end part 7 and the front closing element 14 thus enclose a front cavity 15.

For the liquid-tight seal, sealing elements 16 can be arranged between the front end part 7 and the front closing element 14. The sealing elements 16 may be embodied as O-rings, for example. If required, the front closing element 14 and/or the front end part 7 may have depressions 17 for the sealing elements 16. However, other types of sealing are also possible. For example, the front closing element 14 may be welded to the front end part 7.

In a similar manner, on the rear end part 8, on its side facing away from the external jacket 6, a rear closing element 18 is attached, so that the rear end part 8 and the rear closing element 18 enclose a rear cavity 19. The embodiment of the connecting point between the rear end part 8 and the rear closing element 18 is generally similar to the embodiment of the connection between the front end part 7 and the rear end part 14. In particular, here is it also possible for sealing elements 20, including depressions 21 for the sealing elements 20 as appropriate, to be present and welding is also possible here.

According to the representation in FIGS. 1 and 3, the tubes 13 open in the two cavities 15, 19. Furthermore, the front cavity 15 has a connecting piece 22, via which a liquid coolant 23 can be supplied to the front cavity 15. The liquid coolant 23 is generally water. In certain cases, however, a different medium may be involved, for example an oil. The connecting piece 22 can be arranged as required. In the representation according to FIGS. 1 and 3, there is a radial supply to the front cavity 15. However, an axial supply to the front cavity 15 is likewise also possible.

According to the representation in FIG. 3, the tubes 13 have an inner diameter d1 and an outside diameter d2. Furthermore, the tubes 13 have a respective radial spacing a2 from the stator 2. Where the internal jacket 5 is present, the spacing a2 is preferably determined on the basis of the internal jacket 5. Preferably, the respective radial spacing a2 is at least as large as the inner diameter d1 Better still is if the respective radial spacing a2 is at least as large as the outer diameter d2. This in particular achieves that the two end parts 7, 8 have a sufficiently large radial extension towards the stator 2 in their radially inner region, in which no tubes 13 are arranged, meaning that the corresponding closing element 14, 18—including sealing element 16, 20 as appropriate—can be arranged there.

Figure 4:
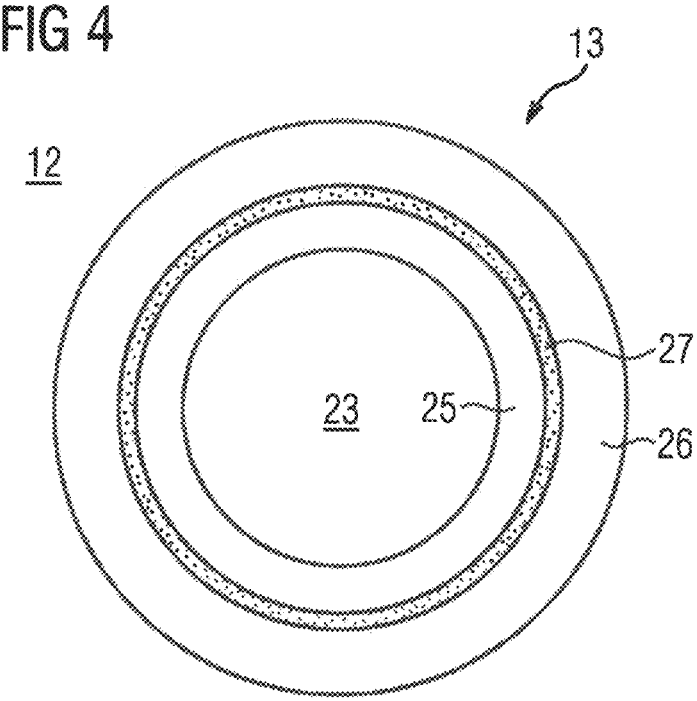
FIG. 4 shows a single tube.

FIG. 4 shows a possible embodiment of one of the tubes 13. For the other tubes 13, which are not shown in FIG. 4, similar embodiments apply.

According to the representation in FIG. 4, the tube 13 is embodied as a double-walled tube 13. It therefore has an internal inner tube 25 and an outer tube 26 which surrounds the inner tube 25. The inner tube 25 guides the liquid coolant 23. The air 12, i.e. the air 12 of the internal cooling circuit, flows around the outer tube 26 in the outer region 10. A spacing of the inner tube 25 from the outer tube 26 should be as low as possible. As appropriate, a medium 27 which conducts heat relatively well, for example an oil, a gel or an adhesive, may be arranged between the inner tube 25 and the outer tube 26.

Figure 5:
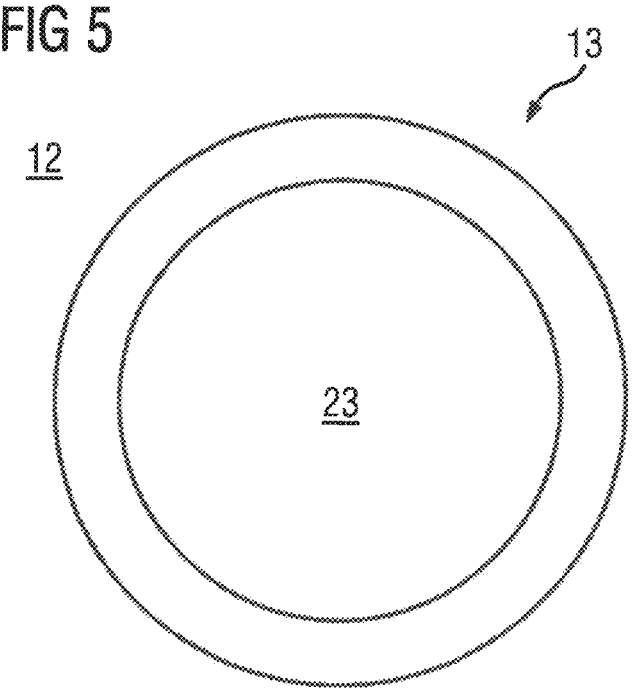
FIG. 5 shows a single tube.

FIG. 5 likewise shows a possible embodiment of one of the tubes 13. This embodiment is an alternative to the embodiment in FIG. 4. For the other tubes 13, which are not shown in FIG. 5, similar embodiments apply—as before.

According to the representation in FIG. 5, the tube 13 is embodied as a single-walled tube 13. It guides the liquid coolant 23 on the inside and the air 12 flowing in the outer region 10, i.e. the air 12 of the internal cooling circuit, flows around it on the outside.

Figure 6:
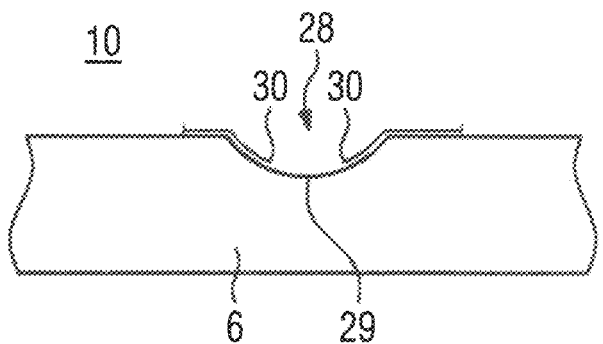
FIG. 6 shows a section of an external jacket.

In the case of the embodiment according to FIG. 5, a detector facility 28 is preferably arranged in the outer region 10 according to the representation in FIG. 6. The detector facility 28 is used to detect whether liquid, i.e. the liquid coolant 23, is located in the outer region 10. Detector facilities 28 of this kind are generally known to persons skilled in the art. For example, in a relatively deep region of the external jacket 6, a small indentation 29 may be arranged, in which the liquid coolant 23 can accumulate, if it escapes from one of the tubes 13 and therefore enters into the outer region 10. In the indentation 29, conductor ends 30 may be arranged as the detector facility 28, which are connected to one another in a conductive manner due to such an accumulation of the liquid coolant 23.

Figure 7:
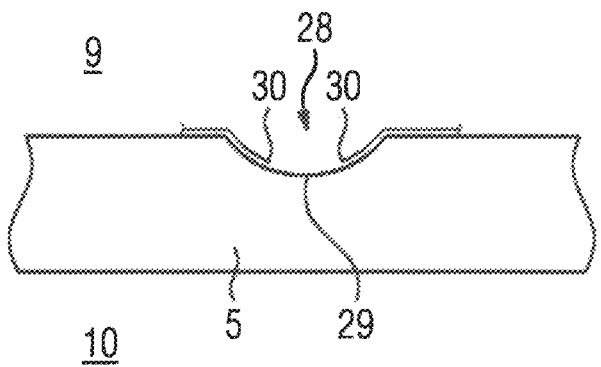
FIG. 7 shows a section of an internal jacket.

A similar embodiment can be adopted for the inner region 9 according to FIG. 7. The embodiment according to FIG. 7 may be implemented as an alternative or in addition to the embodiment according to FIG. 6, as required.

In principle, the embodiment according to FIGS. 6 and/or 7 can also be combined with the embodiment of the tubes 13 according to FIG. 4. In the case of the embodiment of the tubes 13 as double-walled tubes, however, this is no longer necessary.

In the context of the present invention, the liquid coolant 23 is both supplied to the front cavity 15 as well as discharged from it. This will be explained in greater detail below in connection with FIG. 2.

According to FIG. 2, the front closing element 14 has at least one separating wall 31. According to the representation in FIG. 2, the separating wall 31 may run vertically, for example. The front cavity 15 is divided into at least two subregions 32, 33 by means of the separating wall 31. One portion of the tubes 13 opens in the subregion 32, another portion of the tubes 13 in the subregion 33. The subregion 32 has the connecting piece 22, via which the liquid coolant 23 is supplied to the front cavity 15—more precisely: to the subregion 32 of the front cavity 15. The other subregion 33 has a connecting piece 34, via which the liquid coolant 23 is discharged from the front cavity 15—more precisely: from the other subregion 33 of the front cavity 15. The liquid coolant 23 therefore first flows into the subregion 32 via the connecting piece 22, then flows into the rear cavity 19 via the tubes 13 opening in the subregion 32, then flows back into the subregion 33 again via the tubes 13 opening in the subregion 33, and from subregion 33 it is discharged from the front cavity 15 via the connecting piece 34.

The two subregions are therefore separated from one another in a liquid-tight manner by means of the separating wall 31. Furthermore, the front cavity 15 is closed in a liquid-tight manner—with the exception of the connecting pieces 22, 34 for supplying and discharging the liquid coolant 23 and the access points to the axially running tubes 13. The rear cavity 19 is likewise closed In a liquid-tight manner with the exception of the access points to the axially running tubes 13.

In summary, the present invention therefore relates to the following subject:

An electric machine has a rotor 1 and a stator 2, wherein the rotor 2 is able to rotate about an axis of rotation 4. The rotor 1 is radially on the outside of the stator 2r the stator has a radial spacing a1 from an external jacket 6. The external jacket 6 extends radially from a front end part 7 to a rear end part 8 in each case, so that the end parts 7, 8 and stator 2 delimit an inner region 9 which contains the rotor 1, and the end parts 7, 8, the stator 2 and the external jacket 6 delimit an outer region 10 which surrounds the inner region 9 radially on the outside. The inner region 9 and the outer region 10 are interconnected in a communicating manner via recesses 11, so that air 12 is able to flow out of the inner region 9 and into the outer region 10, from which it can flow back again. Axially running tubes 13, which extend between the end parts 7, 8 in the outer region 10, are fastened in the end parts 7, 8. Attached in a liquid-tight manner to each of the end parts 7, 8, on their sides facing away from the external jacket 6, is a closing element 14, 18, so that the end parts 7, 8 and the closing elements 14, 18 enclose a cavity 15, 19 in each case. The front cavity 15 is divided into at least two subregions 32,33 by means of a separating wall 31. Each portion of the tubes 13 opens in one subregion 32,33 or the other. Arranged in each one of the subregions 32,33 is a connecting piece 22,34 for supplying or discharging the liquid coolant 23.

The present invention has many advantages. In particular, the cooling of the electric machine can be considerably improved. As a result, the electric machine can be operated with a higher performance with the same unit size and the same or even reduced weight. In trials, it has proven to be readily possible to implement performance increases of approx. 25%. Furthermore, the noise emission of the electric machine can be reduced.

Although the invention has been illustrated and described in greater detail with the preferred exemplary embodiment, the invention is not restricted by the examples disclosed and other variations can be derived therefrom by the person skilled in the art without departing from the protective scope of the invention.

What is claimed is:

1. An enclosed electric machine with an air-based internal cooling circuit and an external liquid cooling circuit, said electric machine comprising:
    a rotor mounted for rotation about an axis of rotation;
    a stator disposed in surrounding relation to the rotor, when viewed about the axis of rotation;
    an external jacket disposed in surrounding relation to the stator with a varying radial spacing and extending, when viewed in the direction of the axis of rotation, from a front end part to a rear end part, so that the front and rear end parts and the stator delimit an inner region which accommodates the rotor, and the front and rear end parts, the stator and the external jacket delimit an outer region in radially surrounding relation to the inner region on an outside, with the inner and outer regions communicating with one another via recesses to enable air to flow out of the inner region and into the outer region and from there to flow back into the inner region;
    front and rear closing elements respectively attached in a liquid-tight manner to the front and rear end parts on their side facing away from the external jacket, so that the front end part and the front closing element enclose a front cavity and the rear end part and the rear closing element enclose a rear cavity;
    a first connecting piece communicating with the front cavity supplying a liquid coolant; and
    axial tubes distributed over an angle of more than 180° about the axis of rotation and fastened in the front and rear end parts such that the axial tubes extend from the front end part across the outer region to the rear end part, said axial tubes being configured to open in the front and rear cavities, wherein the front cavity is divided into at least two subregions, with a first plurality of the axial tubes opening in one of the subregions and extending to the rear cavity, and a second plurality of axial tubes opening in another one of the subregions and extending to the rear cavity, the first connecting piece being arranged in the one of the subregions and a second connecting piece being arranged in the another one of the subregions, thereby allowing the liquid coolant to flow from the first connecting piece to the one of the subregions of the front cavity, from the one of the subregions to the rear cavity via the first plurality of axial tubes, from the rear cavity to the another one of the subregions via the second plurality of axial tubes, and then to be discharged from the another one of the subregions of the front cavity by the second connecting piece.

2. The electric machine of claim 1, wherein the front and rear end parts and the external jacket enclose the rotor and the stator in an ignition protection type Ex d.

3. The electric machine of claim 1, wherein the axial tubes have an inner diameter, said axial tubes being distanced from the stator at a radial spacing, which is at least as large as the inner diameter.

4. The electric machine of claim 1, wherein the axial tubes have an outer diameter, said axial tubes being distanced from the stator at a radial spacing, which is at least as large as the outer diameter.

5. The electric machine of claim 1, wherein the axial tubes are embodied as double-walled tubes defined by an internal inner tube which guides the liquid coolant and an outer tube which surrounds the inner tube and around which the air, which flows in the outer region, flows.

6. The electric machine of claim 1, wherein the axial tubes are embodied as single-walled tubes, which guide the liquid coolant on an inside and around which the air, which flows in the outer region, flows on the outside.

7. The electric machine of claim 1, further comprising a detector facility arranged in the inner region and/or in the outer region for detecting liquid.

8. The electric machine of claim 1, further comprising an internal jacket in surrounding relation to the stator without spacing, said internal jacket distanced from the outer jacket by a radial spacing.

* * * * *